May 8, 1923.

A. G. NYQUIST 1,454,134

SOUND REPRODUCING MACHINE

Filed Jan. 14, 1921 5 Sheets-Sheet 2

INVENTOR.
ALBERT G. NYQUIST.
BY HIS ATTORNEY.
James F. Williamson

May 8, 1923.

A. G. NYQUIST 1,454,134

SOUND REPRODUCING MACHINE

Filed Jan. 14, 1921   5 Sheets-Sheet 3

INVENTOR.
ALBERT G. NYQUIST.
BY HIS ATTORNEY
James F. Williamson

May 8, 1923.

A. G. NYQUIST

SOUND REPRODUCING MACHINE

Filed Jan. 14, 1921

INVENTOR.
ALBERT G. NYQUIST.
BY HIS ATTORNEY.

Patented May 8, 1923.

1,454,134

UNITED STATES PATENT OFFICE.

ALBERT G. NYQUIST, OF MINNEAPOLIS, MINNESOTA; HILDA L. NYQUIST ADMINISTRATRIX OF SAID ALBERT G. NYQUIST, DECEASED.

SOUND-REPRODUCING MACHINE.

Application filed January 14, 1921. Serial No. 437,184.

*To all whom it may concern:*

Be it known that I, ALBERT G. NYQUIST, a citizen of the United States, residing at Minneapolis, in the county of Hennepin and State of Minnesota, have invented certain new and useful Improvements in Sound-Reproducing Machines; and I do hereby declare the following to be a full, clear, and exact description of the invention, such as will enable others skilled in the art to which it appertains to make and use the same.

This invention relates to sound reproducing machines, and particularly, to such a machine in which are supported a plurality of records which are adapted to be individually selected and played. It is an object of this invention to construct such a machine in which a plurality of disk records are grouped and supported about a central point, the machine being controlled by the manual operation of a controller which may be located at some distance from the machine proper.

It is a further object of the invention to have the machine electrically driven and electrically controlled in the selection of records and the controller can therefore be connected to the machine by a suitable flexible cable of any desired length.

Another object of the invention is to control the machine by a motor of special design which co-operates in a novel way with the selecting mechanism.

Still another object of the invention is to mount the sound box so that the same is disposed in a plane parallel to the records, the latter being preferably mounted in radial vertical planes, and the sound box being further equipped with means so that it can co-operate with the record on either side thereof.

These and other objects and advantages of the invention will become apparent from the following description made in connection with the accompanying drawings in which like reference characters refer to the same parts throughout the different views and in which—

Referring to the drawings, the reproducing machine comprises a suitable base member 1 in the form of a circular box and on the top of which is centrally mounted a fixed tube 2. A second tube 3 is mounted for rotation within the tube 2 and supported by a suitable flange at the top thereof or by an antifriction bearing. The tube 3 carries at its bottom a gear member 4 which is illustrated as made integral with the tube, although the same may be made separated and attached to the tube by any suitable securing means. The tube 3 has an opening extending therethrough near its upper end and a pair of arms 5 and 6 are disposed at either side thereof and pivoted for vertical swinging movement on a pivot member 7 passing through the sides of said tube. These arms are provided at one end, which will be designated as the rear end, with counterweight members 5ª and 6ª. A shaft 8 is mounted between spaced webs at the upper portion of the tube 3 and the tone arm 9 is rigidly mounted on this shaft, the shaft being rotatably mounted so that the arm 9 can swing laterally. The tone arm 9 has a counterweight rod 9ª secured thereto which is provided with suitably adjustable counterweight members 9ᵇ. An arm 10 is secured to the lower part of the tone arm and extends downwardly and outwardly to a point over the arms 5 and 6, and said arm 10 has secured to its underside spaced springs 11 and 12 which depend therefrom and are arranged to normally contact the outer sides of arms 5 and 6, respectively.

Mounted for rotation on the pivot 7 are a pair of spaced pulleys 13, these pulleys being secured together for common rotation, and also having secured thereto an adjacent pulley 14. An electric motor 15 is rigidly secured to and carried at the lower side of gear 4, and this motor has a driving pulley 16 at one end of its armature shaft. A belt 16ª passes around this pulley 16 and over the pulley 14, which is thus driven from the motor 15. A belt 13ª passes over pulley 13 and over a pulley 17 mounted on a short shaft secured to the arm 5. Pulleys 18 and 19 are secured to the pulley 17 to rotate therewith, and a belt 18ᵇ passes over the pulley 18 and over a pulley 20 mounted on a short shaft secured in the end of arm 5, and a pulley 21 is fixed to the pulley 20 to rotate therewith. The belt 13ª is a straight or open belt and a cross belt 14ª passes over the other pulley 13 and over a pulley 17ª also mounted on a short shaft secured in the arm 6, in substantial alignment with the arm carrying pulleys 17 and 18. A pulley 18ª and another pulley 19ª are secured to the pulley 17ª to rotate therewith, and a belt 22 passes over the pulley 18ª and over a pulley 20ª which is mounted on a short shaft secured in the end of the arm 6. A pulley 21ª is fixed to pulley 20ª to rotate therewith. By reference to Figs. 1 and 3, it will be seen that the pulleys 19 and 19ª are of larger diameter than the pulleys 21 and 21ª. A yoke member 23 passes around the tone arm 9 and is provided with a cross piece 24 at its lower end which is hinged to supporting members 25 secured to the outer side of the arms 5 and 6, respectively. A cable member 26 is secured to an equalizing arm 27, and cables 28 are secured to the outer ends of this arm and to the inner side of the arms 5 and 6. The cable 26 passes down inside of tube 3 over a small sheave secured adjacent an opening therein and is secured at its lower end to one end of a lever 29 which is pivoted to the lower part of the base 1. The lever 29 is secured at its other end to the lower end of an armature 30 of a solenoid 31, the armature having a rod extending upward therefrom, which is pivotally secured to one end of a lever 32 also pivoted in the base member 1 and the other end of which is arranged to be swung into engagement with the teeth of the gear 4.

Figure 2:
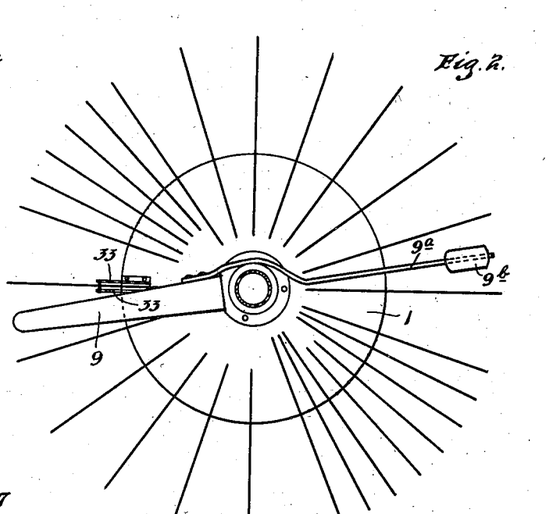
Fig. 2 is a sectional plan view on the line 2—2 of Fig. 1, the machine carrying less than its capacity of records.

Brackets 33 which form rigid supporting members, are provided with base flanges and secured to the top of base member 1 circumferentially about the outer edge thereof. The records, as indicated in Fig. 2, are supported in these brackets in vertical planes, and these records are provided at their centers with small shafts which project from each side thereof and are adapted to seat in bearing grooves 33ª and 33ᵇ formed in the bracket 33. These brackets are designed to support records of different diameter, the small or ten inch records being supported in the upper groove 33ᵇ while the larger or twelve inch records have their central shaft disposed in the groove 33ª. The machine is shown as provided with the usual amplifying horn 34.

Figure 1:
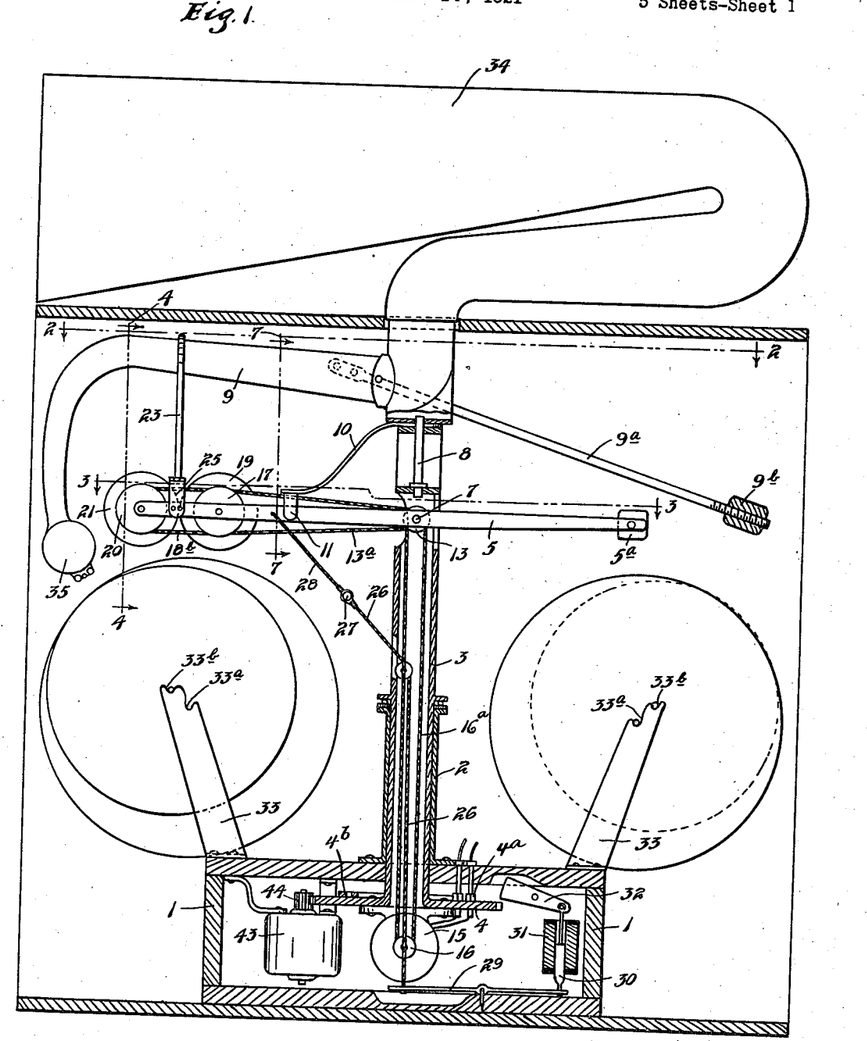
Fig. 1 is a central vertical section of the reproducing machine.

The tone arm 9 carries the reproducer 35. This reproducer as shown in Fig. 1 is disposed with its flat sides parallel to the records. The stylus bar 36 is placed inside of the reproducer and has its outer portion anchored to a block 37 which is arranged to oscillate on pivots 38 which extend outward from the reproducer case. The block 37 is held in position by a spring 37ª, circular in cross section, which lies in a groove formed in the outer edge of the block and the ends of which are fastened to the sides of the reproducer case by suitable screws or other fastening means. Near each end of block 37 is formed a diagonal hole and these holes are adapted to receive the styli or needles 39, the same being held in place by suitable small thumb screws 40. It will be noted that the needles project in opposite directions. In order to facilitate the placing of the stylus or needle in the outer turn of the playing groove of the record when commencing the playing of the same, brushes 41 are provided which are held in place by brush holders 42 secured to the sides of the reproducer casing in a manner so that they will not make contact with the sides of the block 37.

The operation of the machine, as far as described, will now be given.

Figure 3:
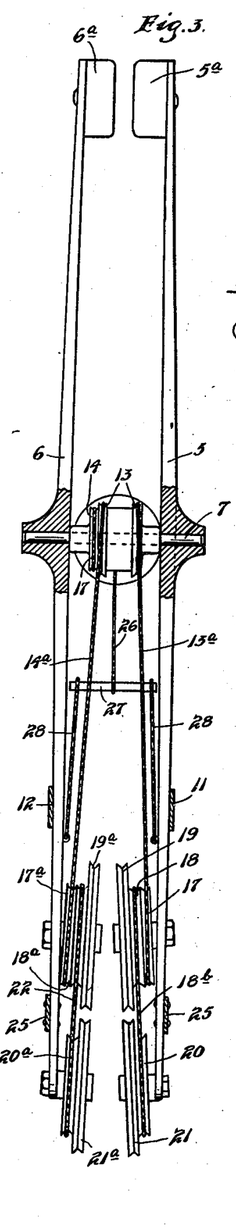
Fig. 3 is a sectional plan view of a part of the device taken on the line 3—3 of Fig. 1.
Figure 4:
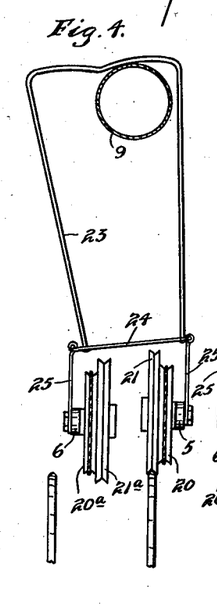
Figs. 4 and 5 are sectional elevations taken on the line 4—4 of Fig. 1 looking in the direction of the arrows showing the parts in different positions.
Figure 5:
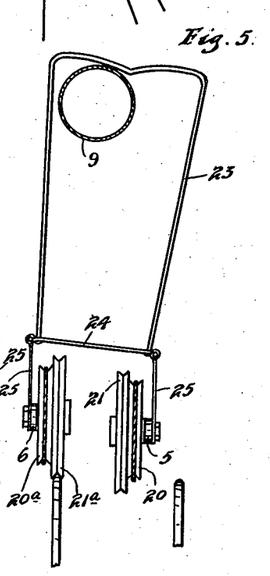

The arms 5 and 6, together with the tone arm 9 are adapted to be swung about the central axis so as to be brought into desired position relative to any one of the supported records. The pulleys 19, 19ª, 21 and 21ª, as shown in Figs. 3, 4 and 5, are provided with peripheral grooves and one of these pulleys is brought into contact with the desired record which engages in the groove thereof and is frictionally driven for playing by the pulley, the pulley being driven through the described belt connections from the motor 15. One of the arms 5 or 6 will be properly positioned by the controller, to be later described, with a pulley thereon aligned with the record. It may be here noted that, as can be seen from Fig. 1, the smaller pulleys 21 and 21ª will come in contact with the smaller record supported on arms 33, while the larger pulleys 19 and 19ª will come in contact with the larger records supported upon said arms and by a smaller movement downwardly of the arms 5 or 6. The driving pulley being aligned with the records, the solenoid 31 will be actuated and the armature 30 will be drawn upwardly therein. This will draw downwardly upon the cable 26 and the lever 32 will, at the same time lock the gear 4 against rotation, so that the driving pulleys cannot swing out of alignment with the record. The cable 26 will pull downwardly upon the equalizer bar 27. As long as no obstruction is offered to either arm 5 or 6, the arms will move downwardly together. When the pulley comes in contact with the record, however, for instance, the pulley on arm 5, said arm will be stopped. The other arm 6, however, will continue to move downwardly and will be withdrawn from contact with its spring 12. As above stated, the springs 11 and 12 bear on the outside of arms 5 or 6. As long as both arms are in contact with these springs, there will be no motion of the arms or tone arm 9 laterally. When one arm is withdrawn below one of the springs, however, the other spring will react against the other arm and, as just described, this arm being in contact with the record and held from rotation and also being held from rotation by lever 32, this reaction of the spring will move the tone arm 9 toward the opposite side of the arm 5. The stylus or needle will thus be brought against the side of the record. When the arm 6 continues to move down, the member 25 secured thereto, will tilt the yoke 23, as shown in Fig. 4, and this will assume the position shown in said figure. Owing to the shape of the top of the yoke, the tone arm will thus be held in position. All four of the pulleys, 19, 19ª, 21 and 21ª are constantly driven when the record is being played, all except the one in contact with the record running idle. It will also be noted that pulleys on one of the arms are for driving the records when one side of the same is placed, while the pulleys on the other arm are for driving the records when the other side thereof is being played, the crossing of the belt 14ª causing the records to be driven in the proper direction. The diameters of the pulleys are also designed to give the proper peripheral speed to the different sized records.

The machine illustrated is designed to carry fifty records, although it will be understood that by correspondingly changing the parts a different number will be carried. There will thus be one hundred selecting movements or positions and each of these selecting movements will be equal to one half the distance between two adjacent records. When the pulleys 19 or 21 are in alignment with the record therein, the pulleys 19ª and 21ª are in a position intermediate the records. One of the styli or needles 39 will contact with the record on one side and the other will contact with the records on the opposite side. The brushes 41 are held adjacent the points of the needle and will first come into contact with the outside of the playing groove and will be drawn inwardly thereby and will thus draw the needles into the playing grooves after which the grooves will guide the needles in the customary way. The counterweights on the tone arm and on the arms 5 and 6 will return the arms to position when the same are released by the breaking of the current in the solenoid 31. The current for the motor 15 will be supplied through brushes 4ª making contact with insulated contact rings 4ᵇ, secured to the upper face of the gear 4.

Figure 6:
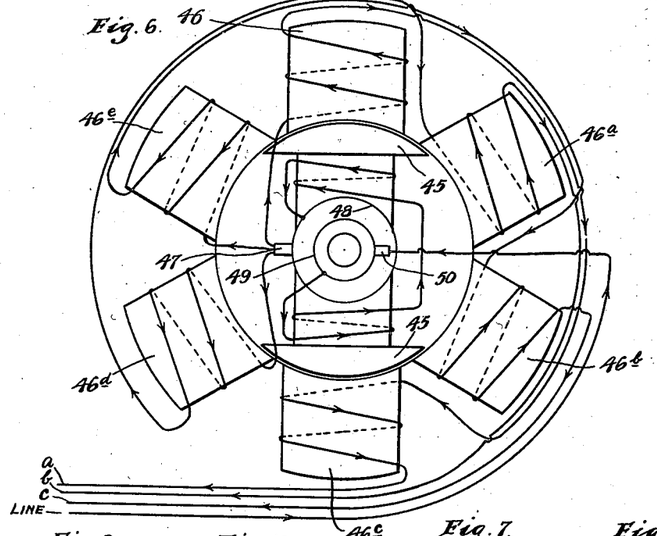
Fig. 6 is a diagrammatic view of the motor windings used with the machine.
Figures 7, 10:
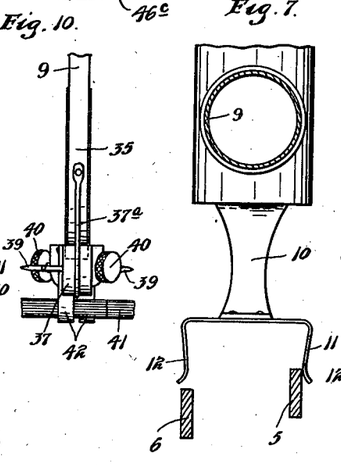
Figs. 7 and 8 are sectional elevations taken on the line 7—7 of Fig. 1, said views showing the parts in different positions.
Fig. 10 is a side elevation of the same.
Figure 8:
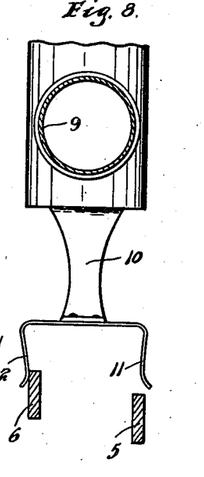
Figure 9:
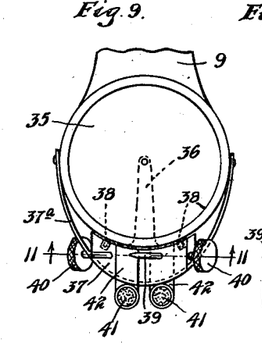
Fig. 9 is a front elevation of the reproducer.
Figure 11:
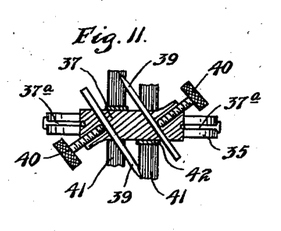
Fig. 11 is a sectional plan view of the same taken substantially on the line 11—11 of Fig. 9.
Figure 12:
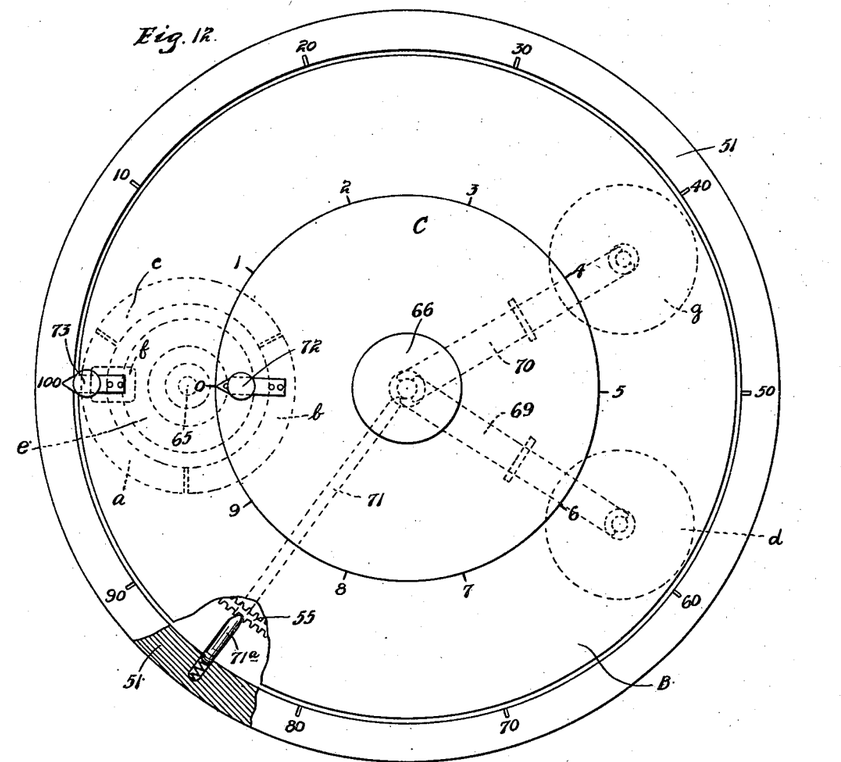
Fig. 12 is a plan view of the controller.
Figure 13:
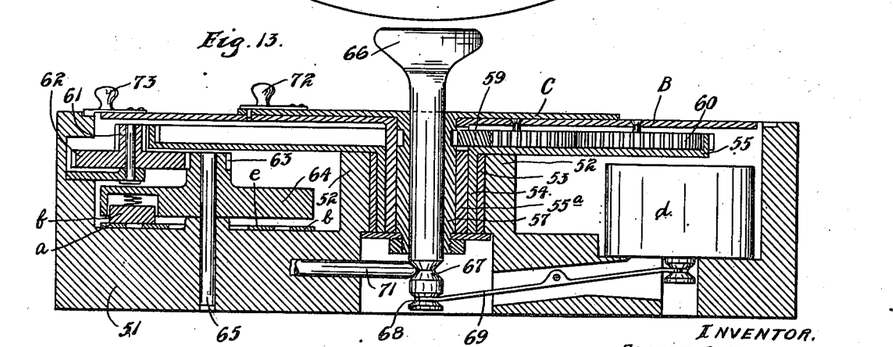
Fig. 13 is a central longitudinal section of the controller.
Figure 14:
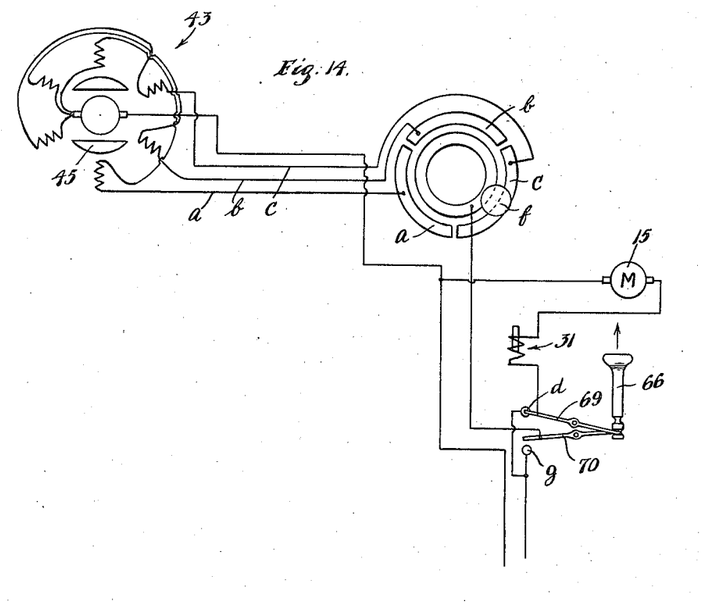
Fig. 14 is a wiring diagram of the controller and sound reproducing machine.

The motor used for making the selection of records is designated as 43 and is mounted on brackets secured to the top of base member 1. The armature shaft for this motor carries a pinion 44 which meshes with the gear 4. The selecting motor 43 is of special construction especially designed to co-operate with the selecting mechanism. As shown in Fig. 6, the motor has two pole armatures 45 and six field poles 46, 46ª, 46ᵇ, 46ᶜ, 46ᵈ, and 46ᵉ, and is so wound that all of the field poles have like polarity, the oppositely located poles being connected in series making three separate field circuits. As shown in Fig. 1, one end of these field circuits is connected to a common commutator brush 47 and the other end of each field circuit is connected through its separate conductor to one of three segments which are located on the controller, which is shown in Figs. 12 and 13 and are designated as $a$, $b$ and $c$, these segments forming a selector ring. The two poles of the armature 45 have like polarity which is opposite to that of the field poles. The windings of the armature are thus in series and have one end connected to the commutator ring 48 and the other to the commutator ring 49. A brush 50 makes contact with the ring 49 and is connected to the power line and, as previously stated, the brush 47, which is connected to the field circuits, makes contact with the ring 48. The other side of the power line is connected through a switch $d$, which is located in the controller, and the contact ring $e$ and thence through a brush $f$ to some one of the segments $a$, $b$ and $c$ of the selector ring, also located in the controller, according to the position of the brush $f$.

As shown in Figs. 12 and 13, the controller comprises a base member 51 made of wood or other suitable insulating material and has placed thereon around the top edge, equally spaced numerals 10, 20, etc., to 100. A central boss 52 is formed in the controller body 51 and has a suitable bushing 53 disposed therein. The sleeve 54 of the gear 55 rotates in the bushing and inside of the sleeve 54 a sleeve 55ª is mounted for rotation, which carries the main dial plate B. The top edge of this plate is substantially flush with the top edge of the controller body 51 and extends closely adjacent the inner edge thereof. The sleeve 57 of the secondary dial plate C is mounted for rotation inside of the sleeve 55ª. The sleeve 57 has gear teeth cut thereabout near its upper end with which meshes a gear 59 which is carried by a stud secured to dial B and which projects through an opening cut in the sleeve 55ª of said dial in order to mesh with the teeth on sleeve 57. The gear 59 meshes with a similar gear 60 also carried on the stud secured to the plate B, and this latter gear meshes with internal teeth cut in the gear 55, the ratio between the gear cut on sleeve 57 and the gear 55 being 1 to 10. The gear 55 shown in Figs. 12 and 13, is also provided with teeth on its exterior and these teeth mesh with a pinion 61 which is attached to a gear 62, both of these gears being mounted on a stud suitably carried in a small bracket secured to the controller body, as shown in Fig. 13. The ratio of the gear 55 and the pinion 61 being 11⅓ to 1. The gear 62 meshes with a pinion 63 which is attached in any suitable way to the selector disk 64 which is mounted on a stud 65 secured in the controller body. The ratio between the gear 62 and pinion 63 is 3 to 1 and this makes the ratio between gear 55 and pinion 63, 33⅓ to 1. The selector disk 64 carries the brush $f$, which is shown as yieldingly urged into contact with one of the segments $a$, $b$ and $c$ and the ring $e$. The sleeve 57, as shown, is suitably secured in the sleeve 55 by a nut and washer plate. A button 66 is carried on a shaft which passes through the opening in sleeve 57 and is provided with a pair of annular grooves 67 and 68 near its lower end. The lower groove 68 has in engagement therewith, the bifurcated ends of a pair of pivoted levers 69 and 70, the pivots of which are suitably located in the body of the controller, and the other ends of which are bifurcated and disposed in engagement with grooved plungers projecting from the switches $d$ and $g$. These switches are of any well known ordinary type of snap switch, and, as shown, are suitably located in the body 51 of the controller. The groove 67 of the bottom shaft receives the end of an L-shaped plunger member 71 which is arranged to slide radially in a suitably formed recess in the controller body and has an inwardly extending projection 71ª at its upper end arranged to engage with the exterior teeth of gear 55. As indicated in Fig. 12, the member 71 is urged inwardly by a coiled spring engaging therewith seated in a radially extending recess in the body 51 in line with said plunger. The button 66 and its shaft are arranged for vertical reciprocation and when the same are in their lowest position, as illustrated, the member 71 engages groove 67 and the member 71ª engages the teeth of gear 55. Any movement of either the dials C or B or of gear 55 is thus prevented. When the button 66 is pulled upwardly, the plunger 71 will be forced out of the groove 67 and will rest on a portion of the shaft between the grooves 67 and 68, the extension 71ª thus being disengaged from the gear 55. When the button is thus pulled upwardly, the plunger of the switch $d$ is pulled down by the lever 69 and the circuit in said switch is closed and current is sent through the segments of the selector ring and the selecting mechanism operated. After the selection has been made, the button 66 is pulled further up aligning the plunger 71 to engage with the groove 68 which locks the controller against further movement, and at the same time, through further movement of the plunger or switch $d$, causes the circuit to be broken in said switch. This final movement of the button 66 closes the circuit in the switch $g$ through the movement of lever 70 and this causes current to be sent to the solenoid 31 and the driving motor 15 which causes the rotation of the record selected. The motor 15 and the solenoid 31 are, of course, connected to and controlled by the switch $g$. When the button 66 is depressed to its lowest position, the circuits are broken in both switches and the controller is locked by means of extension 71ª.

The dial C, as shown in Fig. 12, co-operates with equally spaced numbers ranging from 1 to 10 on dial B and is also provided with a small spring plate having a knob 72 connected thereto, said plate having a depending pin at its outer end adapted to engage with a series of holes in the top surface of the dial B. The dial C can thus be turned and brought into various positions relative to the dial B and will be locked in these positions by the depending pin. The dial B is also provided with a small spring plate having a knob 73 thereon. This plate also has a portion extending therefrom adapted to engage in notches formed opposite the numerals on the edge of the controller body. Dial B will be used to select the pieces on the record in groups of ten and the dial C will be used to select the individual pieces of the group.

The operation of the controller in making a selection is as follows:

It is evident that if the dial C is held stationary with regard to the dial B and the dial B is rotated one complete revolution to the right, the selector disk 64 and the brush $f$ will make 33⅓ complete revolutions in the same direction. This being the ratio between the gear 55 and pinion 63, as above set forth. As there are three segments in the selector ring, there will have been three changes in the circuits for each revolution of the brushes $f$ or 100 changes in all. Referring to Figs. 6 and 12, it will be seen that the field circuits of the selector motor are connected to the selector rings, as follows:

46 and 46ᶜ to segment *a;* 46ᵃ and 46ᵈ to segment *b;* 46ᵇ and 46ᵉ to segment *c*.

Now assuming that the current is flowing through the controller and selecting motor with the circuit as follows:

Through the segment *a*, field circuits 46—46ᶜ commutator brush 47 and ring 48 through the armature circuit ring 49, brush 50 to the power line. The armature will now be held in the position illustrated in Fig. 6, since its poles have opposite polarity from that of the field poles 46—46ᶜ. As the brush *f* leaves the segment *a* and passes on the segment *b*, the circuits through field poles 46—46ᶜ will be broken and a new circuit established through field poles 46ᵃ and 46ᵈ. This will cause the armature to move into alignment with these field poles and the same action will take place when the brush *f* passes onto segment *c*, the circuit then being established through pole 46ᵇ and 46ᵉ with which the armature will then align. The armature will thus make one-sixth of a revolution for each change of circuit and will make 16⅔ revolutions for each revolution of the dial B. Should the dial B be operated in the reverse direction, it will be seen that motor will follow in that direction so that the motor will always keep in step with the controller. As the motor is geared positively to the selecting mechanism of the machine, for every movement of the dial B of the controller, the selector arms 5 and 6 and the tone arm 9 of the machine will make corresponding movement through the pinion 44 and gear 4. Now as above noted, the dial C is connected through the gears 59 and 60 to the gear 55 and the ratio is 1 to 10 for every revolution of the dial C and the gear on its sleeve, and gear 55 will make $\frac{1}{10}$th of a revolution, and accordingly the selecting motor will make ten moves and will move the selecting apparatus, or in other words, the tone arm and driving pulleys over ten spaces or selecting positions. A stop is provided for the dial C to limit its movement to one revolution. As stated above, the dial B is used to select the groups of ten and the dial C to select the individual pieces of the group. Thus, if it is desired to select or play piece 75, on record 38, the dial B will be turned by the knob 73 to the left to bring the pointer of its retaining spring to alignment with the numeral 70. This dial will then be held stationary and the dial C moved by the knob 72 to the right to bring its retaining spring and pointer to the numeral 5. The motor will then be turned, as above described, through the correct number of revolutions and rotate the gear 4 to bring the driving pulley into alignment with the correct record.

From the above description, it will be seen that applicant has produced an efficient machine by which any one of a large number of records can be quickly selected and played, and this selection and playing controlled from a point quite distant from the machine. It is evident that such a machine will have a large range of use and be desirable in many places.

It will, of course, be understood that various changes may be made in the form, arrangement and details of the machine without departing from the scope of applicant's invention which, generally stated, consists in the matter shown and described and set forth in the appended claims.

What is claimed is:

1. A sound reproducing machine having in combination, means for supporting a plurality of disk records in vertical position substantially radially about a central point, and sound reproducing means movable into engagement with any one of said records for playing the same.

2. A sound reproducing machine having in combination, means for supporting a plurality of records in vertical planes radial to a common central point, and means for turning and for playing said records movable into engagement with any one of the same.

3. A sound reproducing machine having in combination, means for rotatably supporting a plurality of disk records in vertical position and radial to a common central point, of turning and playing means for said records rotatable about said point and movable into engagement with any one of said records.

4. A sound reproducing machine having in combination means for rotatably supporting a plurality of disk records in vertical position and radial to a common central point, a reproducer carried on a tone arm, and means for rotating a record, said tone arm and means being rotatable about said common central point and movable into position for playing and rotating any one of said records.

5. A sound reproducing machine having supporting means for disk records, said means being constructed and arranged to support different sized records in vertical planes with one point in the peripheries of the different sized records in horizontal alignment.

6. A sound reproducing machine having in combination, means for rotatably supporting a disk record in vertical position and means comprising a rotating member engaging the peripheral edge of said record for rotating the same.

7. A sound reproducing machine having in combination, means for supporting a plurality of disk records in vertical position and means movable into engagement with any one of said records for rotating the same, comprising a grooved wheel for engaging the periphery of said record.

8. A sound reproducing machine having in combination, means for supporting a plurality of disk records of different size in vertical planes, and means for rotating any one of said records comprising a rotating arm having a plurality of grooved rotating members thereon adapted to engage said records.

9. A sound reproducing machine having in combination, means for rotatably supporting a plurality of disk records of different diameters in vertical planes, and means for rotating said records comprising a rotating arm carrying a plurality of pulleys, said pulleys being of different diameter, and means for driving said pulleys at different rotatable speeds.

10. A sound reproducing machine having in combination, means for supporting a plurality of records of different diameters in vertical position, of means for rotating said records comprising a plurality of grooved rotary members adapted to engage the edge of said records, means for driving said rotary members at different speeds, said means for rotating the records being movable about a central point so as to be brought into engagement with any one of said records.

11. A sound reproducing machine having in combination, means supporting a plurality of records in vertical radial planes, and means movable about a fixed axis and carrying a reproducer having means thereon adapted to engage either side of said records for reproducing the same.

12. A sound reproducing machine having in combination, means for supporting a plurality of disk records in vertical position, means for engaging either side of said records for playing the same, a single reproducer carrying said last mentioned means and means for rotating said records in opposite directions, according to which side of the record is played.

13. A sound reproducing machine having in combination, means for supporting a plurality of disk records circumferentially in vertical planes about a central point, means movable into engagement with any one of said records for playing the same, a selecting means for said records comprising an electric motor having a number of pairs of oppositely disposed alined field poles of the same polarity, a two-pole armature adapted to aline successively with said pairs of poles, and a controller for said selecting means having a movable electrical means connected to said poles for changing the polarity thereof.

14. A sound reproducing machine having in combination, means for supporting a plurality of disk records side by side, a reproducer having a stylus projecting at each side thereof, one of which is adapted to engage one side of the record and the other of which is adapted to engage the other side of the adjacent record, and means for supporting said reproducer with the sides substantially parallel to the faces of said records.

15. A sound reproducing machine having in combination, a reproducer, a stylus carried thereby, and a stiff flexible brush carried by said reproducer mounted in advance of the stylus and adapted to engage with the playing groove of the record and move the reproducer so that the stylus will engage said playing groove.

16. A sound reproducing machine having in combination, a reproducer, a stylus projecting at each side thereof and a stiff flexible brush projecting at each side thereof in advance of the stylus.

17. A sound reproducing machine having in combination, means for supporting a plurality of disk records in vertical position radial to a central point, reproducing and driving mechanism for said records movable about said center and adapted to be brought into engagement with any of said records, and means for moving said reproducing and driving means about said center into alignment with any one of said records.

18. The combination set forth in claim 17, and mechanically controlled magnetically actuated means for operating said last mentioned means in accordance with the movement required to reach the desired record.

19. The combination set forth in claim 17 and a rotating magnetically actuated device geared to said means for driving the same and a controller for said device located at some distance from the sound reproducing machine, said device being adapted to move proportionately to the movement or said controller.

20. The combination set forth in claim 17 and a magnetically actuated device for driving said last mentioned means, and a controller comprising a rotating primary dial and a rotating secondary dial for controlling said device, said controller being located at some distance from the sound reproducing machine and said device being adapted to move proportionately to the combined rotary movements of said dials.

21. The combination set forth in claim 17 and an electric motor for driving said last mentioned means, said motor comprising a plurality of oppositely aligned field poles of the same polarity, each pair of aligned poles constituting a separate field circuit, a two-pole armature adapted to align successively with said oppositely arranged field poles, a controller for controlling said motor comprising a primary and secondary dial, a selector ring having a plurality of segments electrically connected to said field circuits, and gearing between said dials and said selector ring having a definite relation to the number of field circuits.

22. A sound reproducing machine having in combination, a supporting means for supporting a plurality of disk records in vertical planes about a central point, means for playing and driving said records movable about said point and adapted to be brought into alignment with any one of said records, and means for moving said playing and driving means into such alignment comprising a motor having a plurality of field poles of the same polarity arranged in opposite pairs, a two-pole armature in said motor adapted to align successively with the pairs of field poles, a controller comprising a selector ring having a plurality of segments, one for each field circuit, a selector plate carrying a brush movable in engagement with said segments, a primary and secondary dial graduated for the number of records supported on said machine, and gearing between said dials, and said selector plate having a definite relation to the number of field circuits in the motor and the number of records supported.

23. A sound reproducing machine having in combination, means for supporting a plurality of disk records in vertical planes radial to a common central point, playing means for said records comprising a tone arm supported above said records and rotatable about said central point, driving means for said records comprising a plurality of rotating pulleys mounted on an arm movable about said central point, means for rotating said tone arm and said pulley carrying arms, and means for driving said pulleys comprising an electric motor.

24. A sound reproducing machine having in combination, means for supporting a plurality of disk records in vertical planes radial to a common central point, playing means for said records comprising a tone arm supported above said records and rotatable about said central point, driving means for said records comprising a plurality of rotating pulleys mounted on an arm movable about said central point, means for rotating said tone arm and said pulley-carrying arms, means for driving said pulleys comprising an electric motor, and means for moving said tone arm and pulleys into engagement with the records.

25. A sound reproducing machine having in combination, means for supporting a plurality of disk records in vertical planes radial to a common central point, playing means for said records comprising a tone arm supported above said records and rotatable about said central point, driving means for said records comprising a plurality of rotating pulleys mounted on an arm movable about said central point, means for rotating said tone arm and said pulley carrying arms, means for driving said pulleys comprising an electric motor, and means for moving said tone arm and pulleys into engagement with the records comprising a solenoid.

26. A sound reproducing machine having in combination, means for supporting a plurality of disk records in vertical planes radial to a common central point, playing means for said records comprising a tone arm supported above said records and rotatable about said central point, driving means for said records comprising a plurality of rotating pulleys mounted on an arm movable about said central point, means for rotating said tone arm and said pulley carrying arms comprising an electric motor, means for driving said pulleys comprising an electric motor, and means for moving said tone arm and pulleys into engagement with the records comprising a solenoid, said solenoid operating a lever connected to said pulley carrying arms by flexible means and also operating a lever constituting a locking means for said pulley carrying arms and said tone arm.

27. The structure set forth in claim 13, said electrical means comprising a number of segments equal to the number of pairs of said poles, and a contact member adapted to successively engage said segments being connected to said field poles.

28. The structure set forth in claim 27, said controller device comprising a controller handle geared to said electrical means in accordance with the number of records used and the number of pairs of said field poles.

In testimony whereof I affix my signature.

ALBERT G. NYQUIST.